3,117,158
AMINOARYLSULFUR PENTAFLUORIDES
William A. Sheppard, Wilmington, Del., assignor to E. I. du Pont de Nemours and Company, Wilmington, Del., a corporation of Delaware
No Drawing. Filed Mar. 16, 1959, Ser. No. 799,466
6 Claims. (Cl. 260—543)

This invention relates to a new class of organic compounds containing fluorine. More particularly, it relates to organic compounds which contain fluorine, nitrogen and sulfur.

Organic fluorine-containing compounds have attained technical importance in many fields because of the remarkable and unexpected properties which they possess. Organic compounds in which fluorine is bonded to carbon have been investigated extensively but relatively little attention has been given to compounds in which fluorine is bonded to an element other than carbon. In particular, organic compounds which contain fluorine bonded to sulfur have received only limited attention and little information is available on the properties of these compounds.

Perfluoroalkylsulfur trifluorides and perfluoroalkylsulfur pentafluorides are reported to be obtained in low yields by electrolytic processes which employ fluorine and hydrogen fluoride. These compounds are saturated open-chain products which are composed of fluorine, carbon and sulfur. The compounds obtained in the electrolytic processes usually contain no hydrogen. A dinitrophenylsulfur trifluoride, i.e., a compound in which the sulfur is tetravalent, has ben reported. However, no arylsulfur pentafluorides, i.e., compounds in which an —SF$_5$ group is bonded to a nuclear carbon of an aromatic ring, are known. Arylsulfur pentafluorides as a class are unknown.

The new fluorinated organic compounds of this invention are aminoarylsulfur pentafluorides. The new compounds contain an aromatic group having bonded to a nuclear carbon a haxavalent sulfur atom which is bonded to five fluorine atoms, and to another nuclear carbon an amino group.

The new class of compounds is represented by the general formula $$(NH_2)_n—R—(SF_5)_m$$

wherein R is an aromatic group which can be monocyclic or polycyclic and in which the aromatic rings can be separate or fused; $n$ and $m$ are positive whole numbers. Preferably, $n$ and $m$ are at most 3, i.e., $n$ and $m$ are 1, 2 or 3. The sulfur pentafluoride (—SF$_5$) and amino groups are bonded to nuclear carbons of an aromatic ring which nuclear carbons are not necessarily members of the same aromatic ring.

The characterizing structure of the compounds of the invention is an aromatic group having bonded to nuclear carbons at least one sulfur pentafluoride group and at least one amino group. The compounds can have more than one sulfur pentafluoride group or more than one amino group bonded to the aromatic nucleus, for example, 2 or 3 or more of each of these groups can be present. Substituents other than the sulfur pentafluoride groups or the amino groups can be present. For example, the compounds may have as substituents halogens (fluorine, chlorine, bromine), esters and cyano groups. The nuclear carbons of the aromatic groups may have substituents which are alkyl, aryl, acyl, and the like. These substituents are not a critical feature of the new compounds of the invention.

The compounds of the invention show unusual chemical and thermal stability. They are generally liquids or crystalline solids which can be stored without decomposition for long periods in conventional containers under normal atmospheric conditions. The compounds show excellent resistance to degradation by light and by heat. They can frequently be distilled under reduced pressure without decomposition and they are soluble in many organic liquids, for example, ethyl ether, acetone, ethanol, benzene, dioxane, ethyl acetate, dimethyl formamide, and the like. The sulfur pentafluoride group (—SF$_5$) is exceptionally stable and the aminoaryl sulfur pentafluorides can be subjected to many chemical reactions without affecting the sulfur pentafluoride group. The sulfur pentafluoride group is resistant to hydrolysis in neutral, acidic and basic media.

Aminoarylsulfur pentafluorides, i.e., compounds in which the amine group is unsubstituted, can be regarded as the parent compounds of a broad class of new compositions. Aminoarylsulfur pentafluorides, therefore, form a preferred group of compounds which are represented by the formula $(NH_2)_n—R—(SF_5)_m$, where R and $n$ and $m$ have the meanings described previously. R can be monocyclic or polycyclic. If polycyclic, it can be composed of separate or fused rings. Examples of monocyclic aromatic groups are phenyl, tolyl, xylyl, chlorophenyl, and the like. Examples of polycyclic aromatic groups with separate rings are biphenyl, m-terphenyl and p-quaterphenyl. Examples of polycyclic aromatic groups with fused rings are naphthyl, anthryl, phenanthryl, pentacene and hexaphene. The total number of nuclear carbons in the aromatic group is not critical but, preferably, the number of nuclear carbons is at most 24.

The following compounds are illustrative of the new compounds of the invention and derivatives thereof: m-(dibutylamino)phenylsulfur pentafluoride, p-(cyclohexylamino)phenylsulfur pentafluoride, 2,2'-diamino-4,4'-diphenylenebis(sulfur pentafluoride)), 2,2'-dianilino-4,4'-diphenylenebis(sulfur pentafluoride), 4'-(dipropylamino)-4-diphenylsulfur pentafluoride, 2'-amino-4,4''-(p-terphenylene)bis(sulfur pentafluoride), 8-amino-2-naphthylsulfur pentafluoride, 2',3'',5 - triamino-2,5',5''-tris(p-terphenyl)-sulfur pentafluoride, 4-dimethylamino-2-naphthylsulfur pentafluoride, 4 - amino - 2 - ethoxycarbonylphenylsulfur pentafluoride, 4' - butyramido-3,5-diphenylenebis(sulfur pentafluoride), 4 - dimethylamino-1-anthrylsulfur pentafluoride, p - amino-o-methoxyphenylsulfur pentafluoride, p-amino-o-ethylphenylsulfur pentafluoride, p-dicyclohexylamino - m - chlorophenylsulfur pentafluoride, 4-amino-8-dodecyloxy - 1 - naphthylsulfur pentafluoride, p-dimethylamino-o-cyanophenylsulfur pentafluoride, and p-amino-o-propionylphenylsulfur pentafluoride.

The aminoarylsulfur pentafluorides are obtained by several procedures. A method of general application consists in reducing the nitro group in nitroarylsulfur pentafluorides by conventional and well-known methods, e.g., by a catalytic hydrogenation process employing a platinum oxide catalyst. In this process, the nitro group can be reduced completely to the amino group or it can be reduced partially to an azo group.

The nitroarylsulfur pentafluorides from which the amino compounds are prepared, are obtained by reacting a nitroaryl disulfide or a nitroarylsulfur trifluoride with silver difluoride at a temperature of at least 115° C. There can be present in the nitroaryl compounds more than one nitro group, disulfide (—S—S—) group or sulfur trifluoride group. Preferably, there are at most three of each of these groups on the aromatic compound. The meachanism of this reaction is not clearly understood but it can be represented by the following equation for an aromatic compound having one disulfide linkage:

R, in this equation, represents an aromatic group, which has been described earlier for the compounds of the invention, which bears at least one nitro group bonded to a nuclear carbon of an aromatic ring. It is evident from the above equation that a nitroarylsulfur trifluoride, if available, can be employed as a starting reactant in place of the disulfide, and the use of a nitroarylsulfur trifluoride, represents a modification of the broad process employing a disulfide. This method of preparation, starting with either the disulfide or the sulfur trifluoride, is broadly applicable for preparing nitroarylsulfur pentafluorides.

In the operation of the process employing a nitroaryl disulfide, it is desirable although not essential to heat the reaction mixture in two steps. In the first step, the mixture of disulfide and silver difluoride is heated in a suitable solvent for a short period at a temperature which is generally below 100° C. The solvent is then removed and the reaction mixture, which contains principally the nitroarylsulfur trifluoride at this stage, is heated for an additional period to 115-150° C. The reaction product is then purified by conventional procedures, for example, by distillation through an efficient fractionating column, by crystallization, or by chromatography. For the initial heating period, the preferred temperature range is 40-75° C.; for the second heating period, the preferred temperature range is 125-135° C. The time of heating in each step is not critical and will generally be from 0.5 hour to 24 hours.

Silver difluoride is preferably used in excess although the proportions in which the reactants are used are not critical. In general, the molar ratio of the silver difluoride to the disulfide will lie between about 5:1 and 30:1; the preferred ratio lies between about 10:1 and 20:1.

The solvent employed should be unreactive toward silver difluoride under the reaction conditions. The preferred solvents are fully halogenated hydrocarbons in which the halogens are chlorine or fluorine and which boil above 30° C. and below 100° C. However, solvents which boil higher than 100° C. are operable and can be employed. Removal of the solvent while heating the reactants to 115° C. or higher is solely a matter of convenience and is not essential for operability of the process. It is essential that a final reaction temperature of at least 115° C. be employed.

Optionally the mixture of nitroaryl disulfide and silver difluoride can be heated in the absence of a solvent in one step to 115° C. or higher. This procedure is operable and the desired nitroarylsulfur pentafluorides are obtained, although yields of the nitroarylsulfur pentafluorides are generally lower than yields obtained by a process which employs a solvent.

The disulfides employed in the process are obtained by conventional procedures described in the literature. The nitro group or groups can be bonded to any carbon in the aromatic ring, except, of course, the carbon bonded to the sulfur of the disulfide group. The nitro groups do not take part in the reaction and appear unchanged in the final product. This method of preparation, therefore, represents a versatile process for preparing nitroarylsulfur pentafluorides which can be reduced to aminoarylsulfur pentafluorides having amino substituents in any desired position on the aromatic group.

The process employing a disulfide or a sulfur trifluoride is preferably conducted under anhydrous conditions in a vessel whose inner surfaces are resistant to attack by hydrogen fluoride and silver difluoride, for example, poly-(tetrafluoroethylene)resin, platinum or copper.

The nitroarylsulfur pentafluorides can be prepared by nitrating an arylsulfur pentafluoride by well-known procedures, for example, by using nitric acid-sulfuric acid mixtures. The arylsulfur pentafluoride which is used as a reactant in this procedure is obtained by the action of silver difluoride on a diaryl disulfide at a temperature of at least 115° C.

Reduction of the nitroarylsulfur pentafluorides to aminoarylsulfur pentafluorides is effected by well-known and established procedures which are discussed in many texts, for example, Ellis, "Hydrogenation of Organic Substances," chap. XXV, 3rd ed., D. Van Nostrand Co. (1930). The compounds can be reduced under hydrogen pressure in the presence of a broad range of catalysts such as nickel, tin, platinum, titania, palladium, sodium and ammonium polysulfides and sodium and ammonium thiosulfates. Solvents generally are employed in the reduction process, for example, ethanol, ethyl acetate, and acetone. The manner in which the reduction is performed is not critical in view of the stability of the sulfur pentafluoride group.

In the processes described above for preparing the compounds of the invention, the amino groups and sulfur pentafluoride groups can be expected to have the same relative positions on the aromatic group as the nitro and disulfide or sulfur trifluoride substituents in the initial reactant.

The aminoarylsulfur pentafluorides form salts by treatment with inorganic and organic acids, e.g., hydrogen chloride, hydrogen bromide, phosphoric acid, acetic acid, benzoic acid, oleic acid, and the like. The salts are stable compounds which can be isolated in pure form.

The following examples, in which the proportions of reactants are given as parts by weight, illustrate in more detail the preparation of typical aminoarylsulfur pentafluorides. It is understood that in the structural formulas given for the compounds, the valences of carbon not bonded to substituents are satisfied by hydrogen.

EXAMPLE I

This example illustrates the preparation of an amino-substituted arylsulfur pentafluoride in which the amino group is unsubstituted. The preparation of the initial reactant, a nitroarylsulfur pentafluoride, is also described.

*A. Preparation of p-Nitrophenylsulfur Pentafluoride*

A copper reaction vessel (capacity, 1000 parts of water) which is equipped with a condenser made of poly(tetrafluoroethylene)resin and a stainless steel stirrer, is charged with 46.2 parts of bis(p-nitrophenyl)disulfide, 260 parts of silver difluoride and about 312 parts of trichlorotrifluoroethane ("Freon" 113). The reaction mixture is heated with stirring to reflux temperature for 1 hour. The trichlorotrifluoroethane is removed by distillation and the residue is heated for 2 hours at 120-130° C. After cooling about 15 hours, the reaction mixture is extracted with three portions of carbon tetrachloride of about 225 parts each and two portions of chloroform of about 100 parts each. The solvent extracts are combined and the solvent is removed by distillation. There remains a residue of yellow oil and orange solid which is subjected to evaporative distillation at about 80° C. and 1-2 mm. pressure to yield 8.6 parts of p-nitrophenylsulfur pentafluoride ($NO_2C_6H_4SF_5$). The compound, a pale yellow liquid, is further purified by distillation through an efficient fractionating column. It boils at 89.3° C./3.8 mm. and has a refractive index ($n_D^{25}$) of 1.4729. On standing, the pure liquid crystallizes into large prisms which are recrystallized from pentane. The crystals melt at 37.5-38.5° C. The structure of the compound is confirmed by nuclear magnetic resonance, infrared and ultraviolet spectra and by elementary analysis.

*Analysis.*—Calcd. for $C_6H_4NO_2SF_5$: C, 28.9; H, 1.66; N, 5.63; S, 12.87; F, 38.1. Found: C, 29.1; H, 1.85; N, 5.21; S, 12.94; F, 38.7.

*B. Preparation of p-Aminophenylsulfur Pentafluoride*

(1) A Parr hydrogenation apparatus is employed in this process. A pressure vessel (capacity, 500 parts of water) is charged with 8.3 parts of p-nitrophenylsulfur pentafluoride, 78 parts of absolute ethanol, approximately 5 parts of a 5.5 N solution of hydrogen chloride in ethanol and 0.3 part of a commercially available platinum oxide catalyst. The charged reaction vessel is flushed with hydrogen, then pressured to 40 lbs. with hydrogen and shaken for approximately 30 minutes. The reaction vessel is then charged with 0.2 part of fresh platinum oxide and again shaken under hydrogen at 40 lbs. pressure for 60 minutes. The reaction mixture is filtered and the ethanol removed by evaporation at room temperature under an atmosphere of nitrogen. The solid product which remains is triturated with about 75 parts of ethyl ether, the ether is removed by filtration and the solid is washed thoroughly with ether. There is obtained 8.5 parts of the hydrochloride of p-aminophenylsulfur pentafluoride as a fine white powder. The identity of the compound is confirmed by the infrared spectrum and by elementary analysis.

*Analysis.*—Calcd. for $C_6H_7NSF_5Cl$: C, 28.2; H, 2.76; N, 5.48; S, 12.6; F, 37.2; Cl, 13.9; M.W., 255.6. Found: C, 28.5; H, 3.00; N, 5.53; S, 12.5; F, 37.2; Cl, 12.5; M.W., 255.0.

To obtain the free amine compound, i.e., p-aminophenylsulfur pentafluoride, 3.0 parts of the hydrochloride obtained as described in the preceding paragraph is added in small portions and with vigorous stirring to about 60 parts of a 10% aqueous solution of sodium carbonate which is covered with a layer of ethyl ether (about 20 parts). After addition is complete the ether layer is separated and the aqueous layer is extracted twice with ethyl ether. The ether extracts are combined, dried over anhydrous magnesium sulfate, filtered and the ether removed by distillation. The solid residue is dissolved in about 40 parts of pentane and the solution is chilled in ice. There is obtained 1.1 parts of p-aminophenylsulfur pentafluoride as white needle-like crystals which, after drying, melt at 67.5–68.0° C. The identity of the compound is confirmed by the infrared nuclear magnetic resonance and ultraviolet spectra and by elemental analysis.

*Analysis.*—Calcd. for $C_6H_6NSF_5$: C, 32.9; H, 2.76; N, 6.40; S, 14.6; F, 43.3; M.W., 219.2. Found: C, 33.8; H, 2.85; N, 6.31; S, 13.6; F, 43.3; M.W., 221.

(2) A glass reaction vessel, equipped with a magnetic stirrer, is charged with 0.6–0.7 part of p-nitrophenylsulfur pentafluoride, 20 parts of absolute ethanol and 0.3–0.5 part of platinum oxide catalyst. The mixture is stirred to dissolve the nitrophenylsulfur pentafluoride and the reaction vessel is connected to a source of hydrogen. The mixture is stirred under a slight positive hydrogen pressure until absorption of hydrogen is substantially complete. The ethanol is removed by evaporation leaving crude p-amino-phenylsulfur pentafluoride as a crystalline orange-brown solid.

A total of 5.56 parts of p-nitrophenylsulfur pentafluoride is reduced as described in the preceding paragraph to yield 5.7 parts of crude product. The crude product is dissolved in a pentane-ether mixture and chilled. There is obtained 0.83 part of an orange crystalline solid which is recrystallized from carbon tetrachloride to yield bis(p,p'-sulfur pentafluoride)azobenzene, orange needles melting at 163–164° C. The identity of the compound, which has the structure

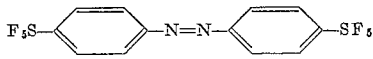

is confirmed by elementary analysis and by the ultraviolet, infrared and nuclear magnetic resonance spectra.

*Analysis.*—Calcd. for $C_{12}H_8S_2N_2F_{10}$: C, 33.2; H, 1.85; S, 14.8; N, 6.47; F, 43.8. Found: C, 33.2; H, 2.04; S, 13.4; N, 6.38; F, 43.0.

Following removal of the azobenzene compound, there is obtained from the remaining pentane-ether solution 3.94 parts of p-aminophenylsulfur pentafluoride. This product is best isolated in pure form as the hydrochloride by dissolving in ether and bubbling dry hydrogen chloride gas through the ether solution. There is obtained 2.62 parts of the hydrochloride of p-aminophenylsulfur pentafluoride, a fine white powder which does not melt at 160° C. but gradually decomposes and sublimes on heating.

*Analysis.*—Calcd. for $C_6H_7NSF_5Cl$: C, 28.2; H, 2.76; N, 5.48; S, 12.6; F, 37.2; Cl, 13.9. Found: C, 28.4; H, 2.87; N, 5.42; S, 12.2; F, 36.9; Cl 13.5.

EXAMPLE II

The procedure of Example I is repeated employing the meta nitro-substituted compound in place of the para nitro-substituted compound of parts A and B. There is obtained in good yield the hydrochloride of m-aminophenylsulfur pentafluoride as a fine white powder whose identity is confirmed by infrared, nuclear magnetic resonance and ultraviolet spectra and by elementary analysis.

*Analysis.*—Calcd. for $C_6H_7NSF_5Cl$: C, 28.2; H, 2.76; N, 5.48; S, 12.6; F, 37.2; Cl, 13.9; M.W., 255.6. Found: C, 28.5; H, 3.16; N, 5.45; S, 12.9; F, 37.4; Cl, 14.3; M.W., 257.0.

The free m-aminophenylsulfur pentafluoride is obtained as described in Example I, part B, section 1. The amine, which is purified by crystallization from pentane at about $-50°$ C., is obtained as white crystals, melting at 34–35° C. The compound can be purified by distillation, boiling at 86.5° C./3.2 mm.; $n_D^{26}$, 1.4821; M.P. 37° C. The identity of the compound is confirmed by nuclear magnetic resonance, infrared and ultraviolet spectra and by elementary analysis.

*Analysis.*—Calcd. for $C_6H_6NSF_5$: C, 32.9; H, 2.76; N, 6.40; S, 14.6; F, 43.3; M.W., 219.2. Found: C, 33.1; H, 3.17; N, 6.62; S, 15.0; F, 44.3; M.W., 221.5.

EXAMPLE III

This example illustrates the preparation of a compound of the invention containing a plurality of sulfur pentafluoride groups on the aromatic nucleus. The preparation of the intermediate compounds used as reactants is described.

A. *Preparation of a Polysulfide*

A reaction vessel fitted with a stirrer is charged with about 260 parts of 55% aqueous hydrogen iodide to which 57.3 parts of 5-nitro-1,3-phenylenebis(sulfonyl chloride) is added rapidly dropwise with vigorous stirring. After addition is complete, aqueous sodium bisulfite solution is added with stirring until no free iodine remains. The solid product is separated from the aqueous reaction mixture by filtration and the product is washed thoroughly with water and acetone. There is obtained 31 parts (93% yield) of a yellow powder which is a polysulfide of the following structure:

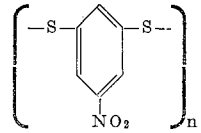

The value of $n$ is unknown but is believed to be 3 or more.

*Analysis.*—Calcd. for $(C_6H_3NO_2S_2)$: C, 38.4; H, 1.60; N, 7.50; S, 34.5. Found: C, 38.9; H, 1.63; N, 7.56; S, 34.6.

B. *Preparation of the Nitroarylsulfur Pentafluoride*

A mixture of 60 parts of the polydisulfide obtained in part A, 550 parts of silver difluoride and about 280 parts of trichlorotrifluoroethane is treated as described in Example II. There is obtained 14.0 parts of 5-nitro-1,3-phenylenebis(sulfur pentafluoride), B.P. 92–93.5° C. at 2.4 mm., M.P. 71–72° C. The identity of the compound, which has the structure

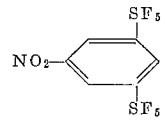

is confirmed by nuclear magnetic resonance, infrared and ultraviolet absorption spectra and by elementary analysis.

*Analysis.*—Calcd. for $C_6H_3NO_2S_2F_{10}$: C, 19.2; H, 0.81; N, 3.74; S, 17.1; F, 50.6. Found: C, 19.2; H, 0.93; N, 3.70; S, 16.7; F, 50.5.

C. *Preparation of the Aminoarylsulfur Pentafluoride*

A Parr hydrogenation unit is employed as described in Example I, part B, section 1. The pressure vessel is charged with 9.7 parts of 5-nitro-1,3-phenylenebis(sulfur pentafluoride), 78–80 parts of absolute ethanol, about 4.5 parts of a 5 N solution of hydrogen chloride in absolute ethanol and 0.3 part of a commercial platinum oxide catalyst. The hydrogenation is conducted at 40 lbs. hydrogen pressure. An additional 0.15 part of platinum oxide catalyst is supplied to the reaction mixture during the process to insure complete hydrogenation. The reaction product is purified as described in Example I and there is obtained 7.5 parts of the hydrochloride of 5-amino-1,3-phenylenebis(sulfur pentafluoride), a cream-colored, fluffy, crystalline solid. The identity of the compound is confirmed by infrared and ultraviolet spectra and by elementary analysis.

*Analysis.*—Calcd. for $C_6H_5NS_2F_{10} \cdot HCl$: C, 18.9; H, 1.59; N, 3.67; F, 49.8. Found: C, 19.3; H, 1.60; N, 3.22; F, 50.45.

The free amino compound is obtained by adding 4.33 parts of the preceding hydrochloride slowly and with stirring to about 100 parts of a 10% aqueous solution of sodium carbonate. The compound is extracted from the aqueous solution with ether and purified as described in Example I. There is obtained 2.8 parts of 5-amino-1,3-phenylenebis(sulfur pentafluoride), a crystalline white solid, M.P. 80.7–81.5° C. The identity of the compound is confirmed by infrared, ultraviolet and nuclear magnetic resonance spectra and by elementary analysis.

*Analysis.*—Calcd. for $C_6H_5NS_2F_{10}$: C, 20.9; H, 1.46; N, 4.06; F, 55.03. Found: C, 21.2; H, 1.48; N, 4.04; F, 55.35.

EXAMPLE IV

This example illustrates a compound of the invention in which the aromatic group is polycyclic and the amino and sulfur pentafluoride groups are bonded to nuclear carbons in different rings. The preparation of the intermediate reactant is also described.

A. *Preparation of 2′- and 4′-Nitrobiphenyl-3-Sulfur Pentafluoride*

A solution of 25.4 parts of the hydrochloride of p-aminophenylsulfur pentafluoride is prepared in 10 parts of water, 10 parts of ice and about 12 parts of concentrated hydrochloric acid. A solution of 7.6 parts of sodium nitrite in 10 parts of water is added gradually to the amine hydrochloride solution at —5° C. to form a solution of the diazonium salt. This solution is added rapidly and with vigorous stirring to about 240 parts of nitrobenzene cooled to 5–6° C. A solution of 30 parts of sodium acetate trihydrate in 80 parts of water is then added dropwise to the above nitrobenzene mixture at a temperature of approximately 5° C. and the mixture is stirred 3 hours at 5–10° C. The nitrobenzene layer which contains the reaction product is separated and the nitrobenzene removed by distillation. The residue is partially purified in a molecular still, the product being a mixture of liquid and solid materials. The mixture is further purified by elution chromatography, employing a column (1″ by 24″) of basic alumina (170 parts) and a 50% solution of benzene is n-hexane. By repeated crystallizations of purified material there is obtained 0.69 part of 4′-nitrobiphenyl-3-sulfur pentafluoride as pale yellow crystals, M.P. 128.6–129.0° C. and 2.05 parts of 2′-nitrobiphenyl-3-sulfur pentafluoride, also as pale yellow crystals, melting at 81.0–81.7° C.

The identity of each compound is confirmed by infrared, ultraviolet and nuclear magnetic resonance spectra and by elementary analysis.

*Analysis.*—Calcd. for $C_{12}H_8NO_2SF_5$: C, 44.3; H, 2.48; F, 29.2; N, 4.31. Found for the 4′-nitro compound: C, 44.7; H, 2.58; F, 29.3; N, 3.83. Found for the 2′-nitro compound: C, 44.9; H, 2.60; F, 28.9; N, 3.92.

B. *Preparation of Aminobiphenylsulfur Pentafluoride*

A Parr hydrogenation unit is employed as described in Example I, part B. A mixture of 2.0 parts of 2′-nitro-3-biphenylsulfur pentafluoride, 70–75 parts of absolute ethanol, approximately 1.0 part of a 5 N solution of hydrogen chloride in ethanol and 0.2 part of platinum oxide catalyst is hydrogenated under 40 lbs. hydrogen pressure. During the reaction 0.1 part of platinum oxide catalyst is added to insure complete hydrogenation of the nitro compound. The product is purified as described in Example I and there is obtained 1.43 parts of the hydrochloride of 2′-amino-3-biphenylsulfur pentafluoride, a white solid in the form of powdery crystals. The identity of the compound is confirmed by the infrared and ultraviolet spectra and by elementary analysis.

*Analysis.*—Calcd. for $C_{12}H_{10}NSF_5 \cdot HCl$: C, 43.44; H, 3.35. Found: C, 43.40; H, 3.98.

The free amine is obtained as described in Example I, part B, by treatment of the hydrochloride with sodium carbonate solution. The amine compound, i.e., 2′-amino-3-biphenylsulfur pentafluoride, generally is obtained as an oil which is difficult to crystallize. It can be reacted with acyl halides to form amides as described in Example VIII.

The compound, 4′-amino-3-biphenylsulfur pentafluoride, is obtained by hydrogenation of 4′-nitro-3-biphenylsulfur pentafluoride, using the procedure described for obtaining the 2′-amino compound. In like manner, 5-amino-1-naphthylsulfur pentafluoride is obtained from 5-nitro-1-naphthylsulfur pentafluoride, 4-amino-2-naphthylsulfur pentafluoride is obtained from 4-nitro-2-naphthylsulfur pentafluoride.

The amino group bonded to a nuclear carbon of the compounds of the invention can have one or two substituents which are chosen from a broad range of organic groups. Compounds of the invention in which the amino group bears substituents are generally obtained by reaction of the primary amino-substituted arylsulfur pentafluoride with the appropriate reagent. The examples which follow illustrate this embodiment of the invention.

EXAMPLE V

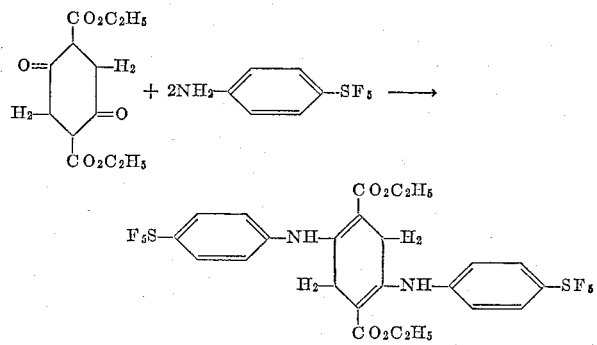

A mixture of 1.0 part of diethyl succinylsuccinate, 1.70 parts of p-aminophenylsulfur pentafluoride, 5.2 parts of glacial acetic acid and approximately 10 parts of ethanol is heated for 0.5 hour at steam bath temperature (85–95° C.). The mixture is cooled to about 25° C. and the solid material which forms is separated by filtration. This solid is extracted with methanol to remove unreacted diethyl succinylsuccinate. There remains 0.5 part of N,N′-[1,4-diethoxycarbonyl - 2,5 - cyclohexa-1,4-dienylene]bis(p-aminophenylsulfur pentafluoride), a yellow solid melting at 210–227° C. whose identity is confirmed by the infrared spectrum and elementary analysis. The structural formula of the compound is given above.

*Analysis.*—Calcd. for $C_{24}H_{24}O_4S_2N_2F_{10}$: C, 43.77; H, 3.67. Found: C, 43.92; H, 3.36.

EXAMPLE VI

To a solution of 2.50 parts of the hydrochloride of m-aminophenylsulfur pentafluoride in 10 parts of water there is added with stirring 1.8 parts of benzoyl chloride. Approximately 10 parts of a 20% aqueous solution of sodium hydroxide is added in small portions with vigorous agitation of the reaction mixture. A white crystalline solid forms during the addition of the sodium hydroxide solution. The solid is separated by filtration, washed with water and dried in air. There is obtained 3.05 parts of m-(benzamido)phenylsulfur pentafluoride which is purified by crystallization from benzene containing a few percent of hexane. The compound, a white solid which melts at 166–167° C., has the following structure:

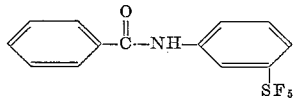

The identity of the product is confirmed by infrared and ultraviolet spectra and by elementary analysis.

*Analysis.*—Calcd. for $C_{13}H_{10}F_5NOS$: C, 48.3; H, 3.13; F, 29.39. Found: C, 48.5; H, 3.02; F, 29.42.

EXAMPLE VII

Approximately 6.0 parts of aqueous 10% sodium hydroxide solution is added dropwise and with vigorous stirring to a mixture of 1.1 parts of 2'-amino-3-biphenylsulfur pentafluoride and 0.6 part of benzoyl chloride. The crystals which form in the reaction mixture are separated by filtration and dried. There is obtained 1.5 parts of 2'-benzamido-3-biphenylsulfur pentafluoride which is purified by crystallization from benzene-hexane solution. The compound is a white solid which melts at 175.2–175.9° C. and has the following structure:

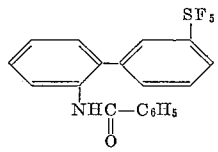

Its identity is confirmed by the ultraviolet and infrared spectra and by elementary analysis.

*Analysis.*—Calcd. for $C_{19}H_{14}NSF_5O$: C, 57.14; H, 3.54; F, 23.8. Found: C, 57.45; H, 3.99; F, 22.8.

The aminoarylsulfur pentafluorides can be reacted with anthraquinone and substituted anthraquinones to obtain violet and purple dyes. For example, the reaction of 1-amino-4-bromo-2-anthraquinonesulfonic acid with p-aminophenylsulfur pentafluoride in the presence of sodium bicarbonate in aqueous alcohol yields a deep colored dye of the following structure:

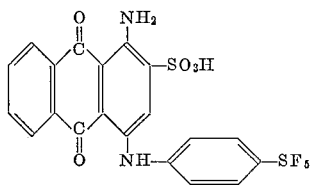

A similar result is obtained when m-aminophenylsulfur pentafluoride is employed in place of p-aminophenylsulfur pentafluoride.

EXAMPLE VIII

A. A solution of 2.2 parts of p-aminophenylsulfur pentafluoride and 2.0 parts of 1,3,3-trimethyl-$\Delta^{2,\alpha}$-indolineacetaldehyde (Fischer's aldehyde, see Lubs, "The Chemistry of Synthetic Dyes and Pigments," A. C. S. Monograph No. 127, p. 250, Reinhold Publishing Co., 1955), in about 3 parts of methanol is heated with stirring to 50° C. for 15 minutes. The solution is maintained at 50° C. and there is added dropwise to the stirred solution 4.0 parts of water, 1.2 parts of 31% hydrochloric acid and an additional 2.5 parts of water. A red oil separates which, after standing at 20° C. for 15–20 hours, forms dark crystals which are separated by filtration. The crystals are washed with a dilute solution of hydrogen chloride in 50% aqueous methanol, dried and ground to a yellow power which is recrystallized from a 15% solution of methanol in water to which a few drops of hydrochloric acid is added. The product which melts at 220° C. is a basic yellow dye of the following structure:

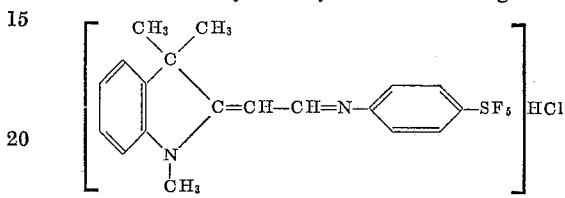

The identity of the compound is confirmed by the infrared spectrum and by elementary analysis.

*Analysis.*—Calcd. for $C_{19}H_{19}N_2SF_5 \cdot HCl \cdot H_2O$: C, 49.9; H, 4.85; N, 6.13; F, 20.8. Found: C, 50.6; H, 4.97; N, 6.07; F, 20.7.

B. The procedure of part A above is repeated using m-aminophenylsulfur pentafluoride in place of p-aminophenylsulfur pentafluoride. There is obtained 4.2 parts of a yellow compound melting at 150–154° C. which has the following structure:

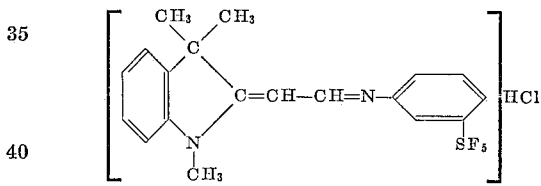

The identity of the compound is confirmed by the infrared spectrum and by elementary analysis.

*Analysis.*—Calcd. for $C_{19}H_{19}H_2SF_5 \cdot HCl \cdot H_2O$: C, 49.9; H, 4.85; N, 6.13; F, 20.8. Found: C, 49.9; H, 5.00; N, 6.07; F, 20.8.

The absorption spectra of these compounds in the visible and ultraviolet regions are given in the following table:

| Compound (position of —SF₅) | Solvent | Wave Length | |
|---|---|---|---|
| | | λ Max. | ε |
| p-SF₅ | C₂H₅OH | 390 | 39,500 |
| | | 305 (broad) | 4,389 |
| | | 245 (broad) | 11,850 |
| p-SF₅ | CH₂Cl₂ | 421 | 51,400 |
| m-SF₅ | C₂H₅OH | 384.5 | 39,500 |
| m-SF₅ | CH₂Cl₂ | 418 | 47,500 |

The compounds of Example VIII are illustrative of a new class of polymethine dyes which have as a characterizing substituent a sulfur pentafluoride group. These dyes are useful for imparting bright yellow hues to fabrics, especially fabrics made of silk, cellulose acetate or polyacrylonitrile fibers. To illustrate, individual pieces (about 5 parts each) are immersed for 45 minutes in a boiling solution which is prepared by dissolving 20 parts of the compounds of Example VIII in 120 parts of acetone and diluting to 20,000 parts with water which contains a small quantity of a commercial polysulfonic acid. The treated fabrics, after washing with water and drying in air, are bright yellow in color.

EXAMPLE IX

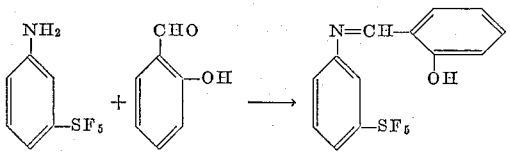

A solution of 2.65 parts of m-aminophenylsulfur pentafluoride and 1.48 parts of salicylaldehyde is prepared in about 1.6 parts of ethanol. The solution is warmed slightly and then cooled. An orange solid is formed which is separated by filtration and dried in air. There is obtained 3.6 parts of m-(o-hydroxybenzylidene)aminophenylsulfur pentafluoride, an orange powder which melts at 103–104° C. to a yellow liquid.

*Analysis.*—Calcd. for $C_{13}H_{10}ONSF_5$: C, 48.30; H, 3.12; S, 9.92. Found: C, 48.86; H, 3.11; S, 9.80.

The anils which are illustrated by the compound of Example IX are useful as dyes and pigmenting agents. The compounds are useful, for example, to obtain light-stable colored paper. To illustrate, sheets of onionskin paper are immersed in a solution of m-(o-hydroxybenzylidene)aminophenylsulfur pentafluoride in alcohol until thoroughly impregnated. The sheets are dried in air to provide orange-colored products in which the color is resistant to degradation by sunlight and heat.

EXAMPLE X

A solution of 0.20 part of sodium nitrite in 0.5 part of water is added slowly and with stirring to a mixture of 0.50 part of the hydrochloride of p-aminophenylsulfur pentafluoride in about 5 parts of glacial acetic acid and 0.9 part of sulfuric acid. The reaction temperature is maintained at 10–20° C. The mixture is stirred for 5 minutes at this temperature and there is then added a solution of 0.25 part of sulfamic acid in 5 parts of water to remove unreacted sodium nitrite. The reaction mixture is added carefully and with stirring to a solution of 1.0 part of β-naphthol in about 50 parts of aqueous 95% ethyl alcohol. A red color develops immediately. The pH of the reaction mixture is adjusted to a value of 8–10 by addition of 10% sodium hydroxide solution at a reaction temperature of 20–40° C. The mixture is stirred for 15 minutes at 20–40° C. and the solid product which forms is separated by filtration. The product, after washing with water and 50% aqueous ethyl alcohol, is crystallized from absolute ethyl alcohol. There is obtained 0.3 part of p-(2-hydroxy-1-naphthylazo)phenylsulfur pentafluoride, M.P. 203–203.5° C. The compound, which is obtained as fine red needles, has the following structure:

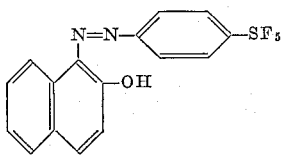

The identity of the compound is confirmed by its infrared spectrum and by elementary analysis.

*Analysis.*—Calcd. for $C_{16}H_{11}N_2SF_5O$: C, 51.51; H, 2.96; N, 7.48; S, 8.56; F, 25.37. Found: C, 51.80; H, 3.12; N, 7.47; S, 7.76; F, 24.60.

The ultraviolet absorption spectrum of this compound in solution in ethanol yields the following data:

| λ Max. | ε |
|---|---|
| 474 | 18,300 |
| 420 | ------ |
| 305 | ------ |
| 250 | ------ |
| 227 | 36,200 |

The compound of Example XI is illustrative of a new class of azo dyes which have as a characterizing substituent a sulfur pentafluoride group. The dyeing properties of this class of compounds is demonstrated as follows:

(A) Individual pieces (about 5 parts each) of fabric made of wool, nylon, silk, and cellulose acetate fibers are immersed for 20 minutes in a boiling dye solution prepared by dissolving 5 parts of the compound of Example X in 10,000 parts of 2% soap solution which contains 50 parts of a dilute sodium silicate solution. The treated fabrics after washing with water and drying in air are orange-yellow in color.

(B) In a similar manner individual pieces of fabric made from nylon, wool, cellulose acetate and silk fibers are immersed for 20 minutes in a boiling dye solution prepared by dissolving 5 parts of the compound of Example X in 10,000 parts of 2% soap solution which contains sufficient glacial acetic acid to provide a solution with a pH of 3–4. The treated fabrics, after washing in water and drying in air, are orange-yellow in color.

Additional examples of this new class of azo dyes are given in Example XI.

EXAMPLE XI

A. A solution of 3.3 parts of the hydrochloride of p-aminophenylsulfur pentafluoride is prepared in 50 parts of water, 25 parts of ice and approximately 3.5 parts of concentrated hydrochloric acid. The mixture is chilled to 2–5° C. and there is added to it rapidly and with stirring a solution of 1.1 parts of sodium nitrite in 3.8 parts of water. The combined solutions are stirred for 15 minutes at 0–5° C. and sufficient sulfamic acid is then added to destroy excess sodium nitriate, using paper impregnated with potassium iodide as an indicator. A small quantity of activated carbon is added with stirring to the cold solution which is then filtered through a pressure filter, using a mat of a commercial filter aid. The clear, pale yellow filtrate is added with stirring to a paste of 2.2 parts of 8-hydroxyquinoline, about 1.8 parts of 30% aqueous sodium hydroxide solution, 6 parts of sodium carbonate and 15 parts of water. The reaction temperature is maintained at less than 10° C. The deep red solution which forms is warmed to about 25° C. with constant agitation for about 2 hours. It is then heated to 50° C. and filtered. The cake which collects on the filter paper is slurried at 50° C. with water, then with water acidified to a pH of 3 with hydrochloric acid and finally with water until the washings are acid-free. The solid is dried in air to yield 3.93 parts of an azo dye, p-(8-hydroxy-5-quinolylazo)phenylsulfur pentafluoride, which has the following structure:

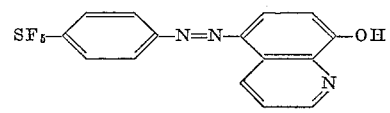

The crude product is dissolved in benzene, the solution is filtered and the product is reprecipitated by dilution of the solution with pentane. The purified product is crystallized from hexane containing a small amount of benzene. The identity of the compound is confirmed by the infrared spectrum and by elementary analysis.

*Analysis.*—Calcd. for $C_{15}H_{10}ON_3SF_5$: N, 11.2; F, 25.3. Found: N, 11.0; F, 27.8.

B. The experiment of Part A is repeated using the hydrochloride of m-aminophenylsulfur pentafluoride in place of the hydrochloride of p-aminophenylsulfur pentafluoride. There is obtained 4.2 parts of a crude azo dye, m-(8-hydroxy-5-quinolylazo)phenylsulfur pentafluoride, which has the following structure:

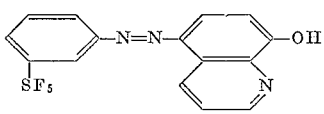

The dye is purified as described in Part A. Its identity is confirmed by the infrared spectrum and by elementary analysis.

*Analysis.*—Calcd. for $C_{15}H_{10}ON_3SF_5$: N, 11.2; F, 25.3. Found: N, 10.6; F, 28.1.

The absorption data in the region of the ultraviolet and visible spectra for each of the above compounds is as follows:

| Compound (Position of $SF_5$ Group) | Solvent | λ Max. | ε |
|---|---|---|---|
| Para | $CH_2Cl$ | 391 | 12,000 |
|  |  | 319 | 9,000 |
|  |  | 243 | 18,000 |
|  | $C_2H_5OH$ | 552 | 7,870 |
|  |  | 470 | 10,500 |
|  |  | 407 | 9,740 |
|  |  | 318 | 9,350 |
|  |  | 243 | 16,500 |
| Meta | $CH_2Cl_2$ | 388 | 11,250 |
|  |  | 316 | 9,750 |
|  |  | 243 | 12,750 |
|  | $C_2H_5OH$ | 555 | 8,290 |
|  |  | 469 | 9,580 |
|  |  | 402 | 8,640 |
|  |  | 313 | 9,650 |
|  |  | 242 | 15,100 |

The compounds of Example XI are useful as dyes for imparting orange and orange-brown hues to fabrics made of nylon, wool, cellulose acetate, and silk fibers employing the dyeing procedures described for the compound of Example VIII.

The compounds of Examples VIII–XI, employed as dyes, show excellent light stability, wash fastnesses and resistance to fading. The compounds are useful as pigments in coating compositions for application to wood and metal surfaces.

EXAMPLE XII

A solution is prepared which contains 25.4 parts of the hydrochloride of p-aminophenylsulfur pentafluoride, approximately 70 parts of concentrated hydrochloric acid and 25 parts of mixed ice and water. To this solution, cooled to 10° C. or less, there is added slowly and with vigorous stirring a solution of 7.6 parts of sodium nitrite in 10 parts of water. One-half of the solution, which now contains the diazonium chloride,

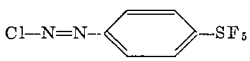

is cooled to 5° C. or less and to it there is added slowly a solution of 3.4 parts of sodium azide in 10 parts of water. After addition of the sodium azide solution is complete, the reaction mixture is stirred at 0° C. for 30 minutes. The mixture is extracted with ether, the ether extract is dried over anhydrous magnesium sulfate, and the ether solution is then filtered. The ether is removed by evaporation and the liquid residue is distilled under reduced pressure through an efficient fractionating column to yield 9.52 parts of p-azidophenylsulfur pentafluoride, which has the following structure:

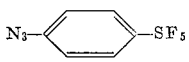

The compound is a colorless liquid boiling at 57.5° C./1.0 mm.; $n_D^{25}$, 1.4917. Its identity is confirmed by elementary analysis.

*Analysis.*—Calcd. for $C_6H_4N_3SF_5$: C, 29.4; H, 1.65; F, 38.75. Found: C, 30.1; H, 2.15; F, 38.40.

Examples of other azides which are prepared by the process of Example XII are 4'-azido-4-biphenylsulfur pentafluoride, 4''-azido-3-(m-terphenyl)sulfur pentafluoride, 5-azido-1,3-phenylenebis(sulfur pentafluoride), 8-azido-1-naphthylsulfur pentafluoride, 4-azido-1-anthrylsulfur pentafluoride, and 7-azido-2-phenanthrylsulfur pentafluoride.

The azides are generically useful as blowing agents in the preparation of rigid foams obtained from polymers. To illustrate, p-azidophenylsulfur pentafluoride begins to evolve nitrogen at 140° C. and at 145–150° C. nitrogen gas is evolved in a gentle steady stream leaving a product which is orange in color. A 5% solution of the azide in a vinyl monomer, for example, styrene, which contains a polymerization catalyst, when heated to a temperature sufficient to initiate polymerization, forms a porous rigid foam of polystyrene which is orange in color.

The new compounds of the invention, as a group, are useful in many fields. The aminoarylsulfur pentafluorides of the formula $(NH_2)_nR(SF_5)_m$ are useful for preparing dyes and pigments and blowing agents as illustrated in the previous examples. The compounds of the invention in which the nitrogen bears one or two simple substituents, such as hydrocarbyl or acyl groups, possess excellent resistance to degradation at high temperatures. They can be employed as heat exchange media to obtain accurate control of temperature in chemical reactions. These compounds as well as the unsubstituted parent aminoarylsulfur pentafluorides are useful as solvents for highly fluorinated polymers obtained from fluoroolefins. Solutions of such polymers are useful in making cellulosic compositions waterproof. To illustrate, a 10% by weight solution of a low molecular weight, low melting polytetrafluoroethylene polymer (melting range 83–150° C.) is prepared by warming the polymer in m-aminophenylsulfur pentafluoride until the polymer dissolves. Strips of cellulose filter paper are partly immersed in the warm solution for 0.5–1.0 minute. The strips are removed, washed thoroughly with acetone and dried in air. The treated areas of the filter paper are not wet by drops of water, whereas the untreated areas are immediately and completely wetted by water. The treated areas of the paper do not support combustion, whereas the untreated areas burn readily. Similar results are obtained when a dialkylaminoarylsulfur pentafluoride, e.g., N,N-diethylaminophenylsulfur pentafluoride, or an acyl-substituted aminoarylsulfur pentafluoride, e.g., p-acetamidophenylsulfur pentafluoride, is employed.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A compound selected from the group consisting of aminoarylsulfur pentafluorides having the formula $$(NH_2)_n-R-(SF_5)_m$$

and acid addition salts of said aminoarylsulfur pentafluorides, wherein R is a carbocyclic aromatic group having a nucleus selected from the group consisting of separate and fused benzene nuclei and having at most 24 nuclear carbons, wherein substituents on said aromatic group other than amino and sulfur pentafluoride groups are selected from members of the group consisting of lower alkoxycarbonyl, lower alkoxy, lower alkyl, halogen, cyano, and lower alkyl carbacyl, and $n$ and $m$ are positive whole numbers of up to and including 3.

2. Hydrochloride salts of the compounds of claim 1.

3. p-Aminophenylsulfur pentafluoride.

4. m-Aminophenylsulfur pentafluoride.
5. 5-amino-1,3-phenylenebis(sulfur pentafluoride).
6. 2′-amino-3-biphenylsulfur pentafluoride.

References Cited in the file of this patent

UNITED STATES PATENTS 2,174,512   Holt et al. _____ Oct. 3, 1939

OTHER REFERENCES

Patterson et al.: "The Ring Index," 1940, page 409.
Emeleus et al.: "Journal of the Chemical Society" (London), 1946, page 1131.